United States Patent [19]
Neary

[11] 3,736,811
[45] June 5, 1973

[54] BALANCE WEIGHT ATTACHMENT FOR TURBINE WHEELS

[75] Inventor: Richard A. Neary, Schenectady, N.Y.

[73] Assignee: General Electric Company, Schenectady, N.Y.

[22] Filed: Aug. 19, 1971

[21] Appl. No.: 173,101

[52] U.S. Cl. .................. 74/573, 416/144, 416/215
[51] Int. Cl. .................................................. F16f 15/32
[58] Field of Search .................. 74/573; 51/169; 416/144, 145, 215

[56] References Cited

UNITED STATES PATENTS 2,957,366  10/1960  Driver et al. ........................ 74/573
2,958,165  11/1960  Hofmann ......................... 74/573 X

FOREIGN PATENTS OR APPLICATIONS 24,573  3/1912  Great Britain ...................... 51/169

Primary Examiner—Charles J. Myhre
Assistant Examiner—F. D. Shoemaker
Attorney—William C. Crutcher and James W. Mitchell

[57] ABSTRACT

A balance weight attachment for use in the balance groove of a turbine wheel wherein the necessity of an access slot for inserting the balance weight attachment is obviated. The balance weight attachment is formed so that it may be inserted anywhere along the balance groove and then locked in place by a screw adjustment which loads against the side of the groove.

3 Claims, 5 Drawing Figures

PATENTED JUN 5 1973  3,736,811

BALANCE WEIGHT ATTACHMENT FOR TURBINE WHEELS

BACKGROUND OF THE INVENTION

This invention relates in general to wheel balancing, and in particular to balancing a turbine unit rotor by means of a weighted insert.

In the manufacture of turbo-machinery, if excess vibration is to be avoided, it is necessary that all rotating parts be balanced to within several inch grams. Turbine wheels are sometimes formed with an annular dovetail groove located within the balance plane and hence called a "balance groove." Weights are inserted into the dove-tail balance groove through either one of two oppositely situated access slots, and then are positioned by sliding the weights around the balance groove. When the proper balance is achieved, the weights are secured within the balance groove.

Sometimes, due to necessities of construction, obstructions such as rotor bolts are circumferentially arranged in the balance groove path causing interruptions in the balance groove, therefore obstructing the sliding of weights into place and requiring that the weights be inserted at the point of balance. It is then required to have available a weight which can be inserted at the point of balance without the aid of an enlarged access slot in the dovetail balance groove.

One solution is the use of "split weights" hereinafter described. The use of "split weights" has been generally satisfactory but the possibility of failure and consequent damage has required a search for a new way of inserting the balance weights.

OBJECTS OF THE INVENTION

Accordingly, it is one object of the present invention to provide an improved balance weight attachment.

Another object of the invention is to provide an improved balance weight attachment which will obviate the necessity of an access slot within the dovetail balance groove.

Another object of the invention is to provide a one-piece balance weight to replace the "split weight" device.

Finally, it is an object of this invention to provide a universal balance weight attachment which will be suitable for both continuous and interrupted balance grooves.

Other objects, advantages and features of the present invention will become apparent from the following description of the preferred embodiment thereof when read in connection with the accompanying drawing.

SUMMARY OF THE INVENTION

A one-piece balance weight attachment for a turbine wheel wherein the balance weight may be inserted into a balance groove without an access slot. The balance weight is formed so that it may be inserted any place around the annular balance groove. One side of the balance weight is formed with a projection which bears against one side of the balance groove while the body portion of the balance weight is formed with an oblique threaded hole into which a fastener is inserted until it engages the other side of the balance groove.

DETAILED DESCRIPTION OF THE INVENTION

Figure 1:
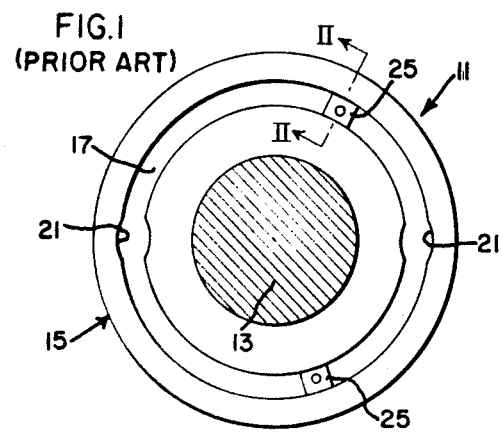
FIG. 1 is a front elevation view of a turbine wheel with an uninterrupted balance groove.

Referring now to the accompanying drawings, FIG. 1 discloses a turbine rotor generally shown at 11 comprised of a shaft portion 13 and a wheel portion 15. An annular dovetail groove 17 or similar groove which is narrower at the top than at the bottom is cut into the wheel face and is formed with oppositely disposed, enlarged access slots 21. The slots are usually oppositely disposed and formed in pairs because it is desired to maintain the wheel balance, although one slot is sufficient for the purpose of mounting balance weights into the balance groove.

Figure 2:
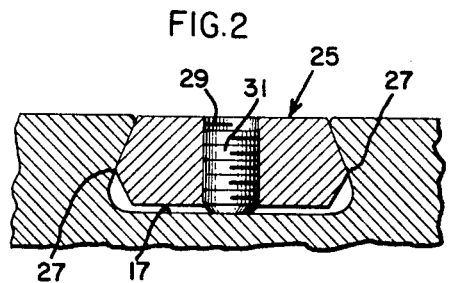
FIG. 2 is a cross section view of a balance groove taken along II—II of FIG. 1 having the conventional prior art balance weight inserted therein.

A conventional balance weight 25 is disclosed in FIG. 2 and is comprised of two side projections 27 which may engage either side of the balance groove, and a vertical threaded hole 29 into which a screw 31 is inserted. The screw is tightened, causing the balance weight to load against the sides of the groove. The screw itself is turned against the bottom of the groove. The balance weights are inserted in pairs so as to provide a fine adjustment when balancing.

Figure 3:
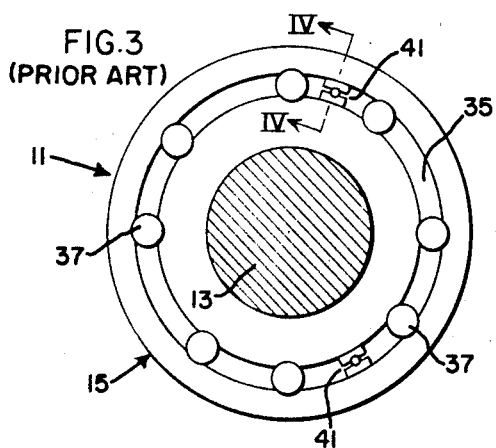
FIG. 3 is a front elevation view of a turbine wheel with an interrupted balance groove.

FIG. 3 shows a turbine wheel including an interrupted balance groove 35. A number of circumferentially spaced bolts 37 are arranged in the groove path so that the use of a single pair of access slots would be ineffective. Therefore, it becomes necessary to insert the balance weights into the balance groove without the use of the slots.

Figure 4:
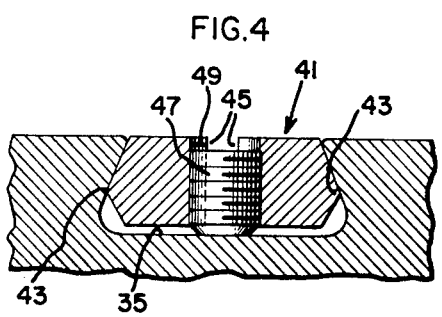
FIG. 4 is a cross-section view of a balance groove taken along IV—IV of FIG. 1 having the prior art "split weight" balance weight inserted therein.
Figure 5:
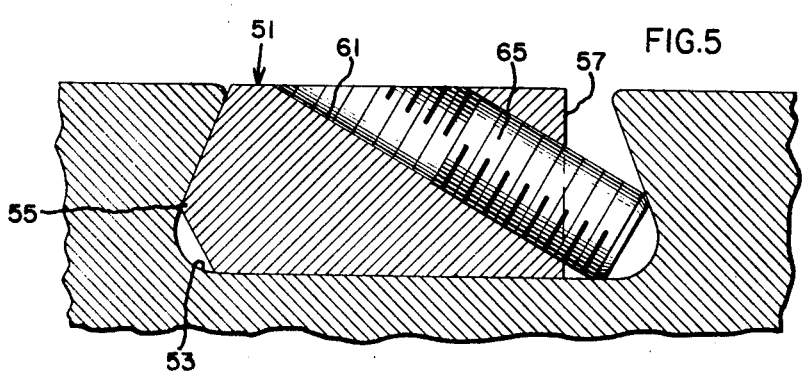
FIG. 5 is an enlarged cross-section view of a balance groove of the type shown in either FIG. 1 or FIG. 3 having the present invention applied thereto.

A split weight 41 as shown in FIG. 4 has been devised in the prior art, comprised of two halves, each having a side projection 43. The two halves are rejoined once inserted into the dovetail groove at a seam 45 as the screw 47 in the threaded hole 49 is tightened against the bottom of the groove.

The present invention obviates the necessity of the split weight construction by providing a single body portion 51 mounted in a groove 53 which may represent either an interrupted or uninterrupted balance weight groove. One side of the body portion may be formed with a projection 55 which may bear against one side of the groove while the other side of the body portion is formed with a generally flattened surface 57.

A threaded oblique passageway 61 is cut into the body portion so that a set screw 65 may be passed therethrough so as to bear against the other side of the groove when the screw is tightened. This will cause the balance weight to be secured within the groove.

In operation, the balance weights are inserted into the dovetail groove projection side first and then secured by screws. Removal is accomplished by loosening the screw and then withdrawing the balance weight, flattened side first, from the groove.

While this invention has been generally discussed in terms of using screws as the fastening means for the balance weight, it should be appreciated that other types of fasteners may also be be employed.

While there is shown what is considered to be the preferred embodiment of the invention, it is of course understood that various other modifications may be made therein, and it is intended to cover in the appended claims all such modifications as fall within the true spirit and scope of the invention.

What is claimed is:

1. A balance weight attachment for a wheel, the wheel having an annular dovetail groove formed thereon defined by a pair of opposing sloping sides and a base; said balance weight attachment comprising:

a body portion having a projection thereon defining an inclined surface substantially conforming to a portion of one of said dovetail sides;

the body portion also including an oblique passageway therethrough and directed toward the opposite side and base of said dovetail groove; and, fastening means inserted in said passageway and disposed to load against the opposite side and base of said groove.

2. The balance weight attachment as recited in claim 1 wherein the oblique passageway is a threaded hole and the fastening means is a set screw.

3. The balance weight attachment according to claim 1 wherein the body portion is flat on the side opposite the inclined surface.

* * * * *